United States Patent [19]
Quinn et al.

[11] 3,944,517
[45] Mar. 16, 1976

[54] NOVEL POLYETHERIMIDES PREPARED FROM TOLANE DIANHYDRIDE OR DICHLOROETHYLENE DIPHENYLENE DIANHYDRIDE

[75] Inventors: Clayton B. Quinn; Frank J. Williams, both of Scotia, N.Y.

[73] Assignee: General Electric Company, Schenectady, N.Y.

[22] Filed: Mar. 14, 1975

[21] Appl. No.: 558,223

[52] U.S. Cl..... 260/47 CP; 260/46.5 E; 260/474 A; 260/49; 260/50; 260/78 TF; 260/78 UA; 260/346.3; 428/435; 428/443; 428/458; 428/474
[51] Int. Cl.² .................. C08G 73/10; C08G 8/02
[58] Field of Search ....... 260/47 CP, 78 TF, 47 UA, 260/49, 326, 346.3, 78 UA, 46.5 E, 50

[56] References Cited
UNITED STATES PATENTS

| | | | |
|---|---|---|---|
| 3,699,075 | 10/1972 | Lubowitz | 260/49 |
| 3,803,085 | 4/1974 | Takehoshi et al. | 260/46.5 E |
| 3,875,116 | 4/1975 | Heath et al. | 260/47 CP |

*Primary Examiner*—Lester L. Lee
*Attorney, Agent, or Firm*—Joseph T. Cohen; Jerome C. Squillaro

[57] ABSTRACT

This invention is concerned with polyetherimides derived from the reaction of an organic diamine and a dianhydride selected from the class consisting of a tolane dianhydride and a dichloroethylene diphenylene dianhydride.

8 Claims, No Drawings

NOVEL POLYETHERIMIDES PREPARED FROM TOLANE DIANHYDRIDE OR DICHLOROETHYLENE DIPHENYLENE DIANHYDRIDE

This invention is concerned with a new class of polyetherimides. More particularly, the invention is concerned with polyetherimides derived from the reaction of an organic diamine and a class of dianhydrides selected from the class consisting of a tolane dianhydride and a dichloroethylene diphenylene dianhydride, wherein the polymer is composed of units of the formula I 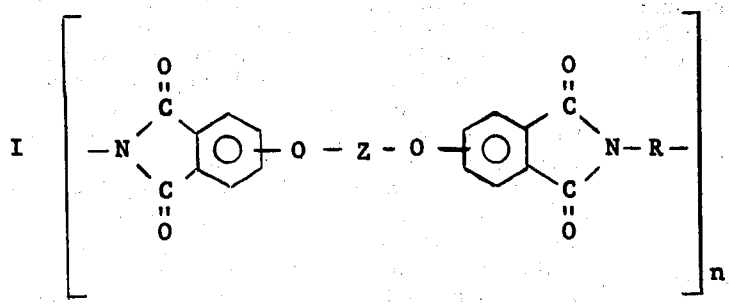

where Z is a member selected from the class consisting of the

II 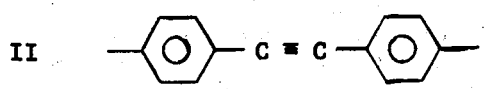

group and the

III 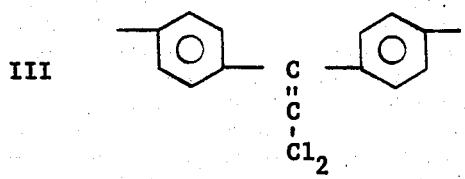

group, R is a divalent organic radical, and n is a whole number in excess of 1, e.g., 10 to 10,000 or more.

The above-described polyetherimides can be made, for example, directly from the reaction of dianhydrides of the formula IV 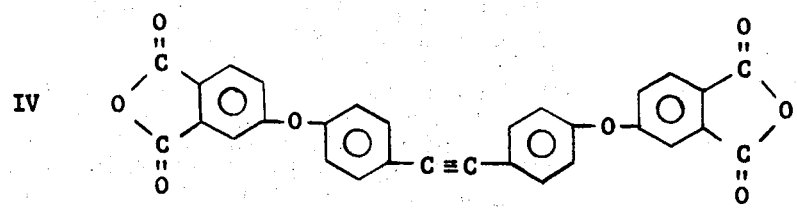

and

V 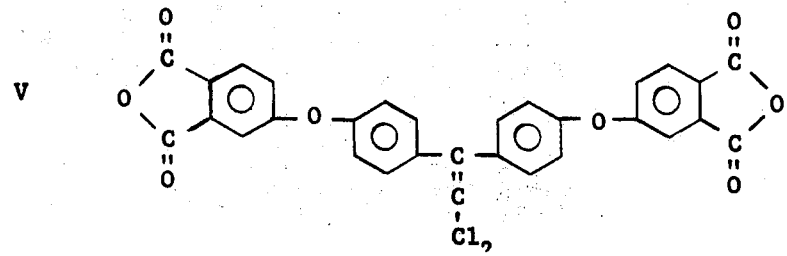

which dianhydrides and method for preparing the same are more particularly disclosed and claimed in our copending application Ser. No. 558,222, filed concurrently herewith and assigned to the same assignee as the present invention. By reference, this copending application is made part of the disclosures and teachings of the instant application. Alternatively, the 3-substituted dianhydrides may replace the 4-substituted dianhydrides referred to above.

Briefly stated, these dianhydrides may be obtained by the reaction of either N-methyl-4-nitrophthalimide or N-methyl-3-nitrophthalimide with the dialkali metal salt of either tolane or 1,1-bis(p-hydroxyphenyl)-2,2-dichloroethylene (hereinafter referred to as "HDE") having the formula VI 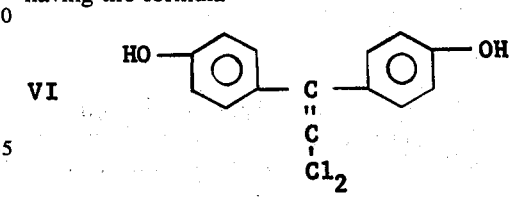

to form the corresponding N-methyl bisimide, treating the latter to form the corresponding tetraacid and dehydrating the tetraacid to the corresponding dianhydride. More particular directions for preparing and obtaining the aforesaid two dianhydrides may be found in our aforementioned copending application.

In accordance with our invention, the polyetherimides of formula I can be obtained by reacting the dianhydride of formulas IV or V with a diamino compound of the formula

VII    $H_2N-R-NH_2$ advantageously employing a suitable solvent in which to offset interaction. Alternatively, the polyetherimides of the present invention can also be prepared by a melt polymerization whereby the aforesaid class of dianhydrides are reacted with the desired diamino compound of formula VII while heating the mixture of ingredients at elevated temperatures with concurrent intermixing in an apparatus suitable for the purpose such as a Brabender mixing bowl.

In the above diamino compound, R is a divalent organic radical selected from the class consisting of (a) aromatic hydrocarbon radicals having from 6 to 20 carbon atoms and halogenated derivatives thereof, (b) alkylene radicals, $C_{(2-8)}$ alkylene terminated polydiorganosiloxanes, cycloalkylene radicals having from 2 to 20 atoms, and (c) divalent radicals included by the formula

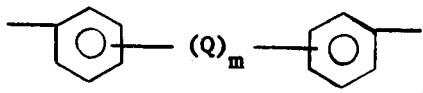

where Q is a member selected from the class consisting of

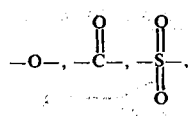

—S—, and —$C_xH_{2x}$—, X is a whole number of from 1 to 5, inclusive, and $m$ is 0 or 1. Included among the organic diamines of formula VII are, for example, m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis($\beta$-amino-t-butyl)toluene;
bis(p-$\beta$-amino-t-butylphenyl)ether;
bis(p-$\beta$-methyl-o-aminopentyl)benzine;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane, etc., and mixtures of such diamines.

In the practice of the invention, a mixture of essentially equimolar amounts of dianhydride of formulas IV and V and the organic diamine of formula VII are heated either in a solvent or if in the form of a melt, heating is conducted until the mixture is at least partially converted to a melt. If employing a melt preparation, stripping along with agitation of the melt, facilitates the eventual removal of any organic diamine which is used in excess of the amount required for polymer formation. Generally, in the melt polymerization technique, temperatures between about 200° to 400°C. and preferably 230° to 300°C. can be employed.

Although equimolar amounts of the organic diamine and the dianhydride provide for high molecular weight polyetherimides, in certain instances, a slight molar excess (about 1 to 5 mol percent) of the organic diamine can be employed resulting in the production of polyetherimides having terminal amine groups. These polyimides are injection moldable and can be reinforced by fillers, such as silica, carbon, fibers, glass fibers, etc., in which the filler comprises on a weight basis from 20 to 200 parts of filler per 100 parts of polymer.

As pointed out in our aforementioned copending application, the dianhydride of, for instance, formula IV, can be prepared by reacting N-methyl-4-nitrophthalimide with an alkali metal salt of tolane in a suitable solvent, to give the corresponding 4,4'-bisimide. This bisimide is then hydrolyzed to the corresponding 4,4'-tetraacid by treatment with aqueous sodium hydroxide and water and then heating with aqueous hydrochloric acid, and finally preparing the dianhydride from the tetraacid by treatment with acetic acid and acetic anhydride to form the desired tolane dianhydride of formula IV.

The dianhydride of formula V can be prepared similarly as in the preparation of the dianhydride from tolane, but instead employing HDE in place thereof and essentially following the same steps. More particular directions for preparing these two dianhydrides may be found in our aforementioned copending patent application.

The following examples illustrate but do not limit for persons skilled in the art the preparation of polyetherimides from the aforesaid two dianhydrides. The oxygen index measurements were obtained in accordance with the method described in U.S. Pat. No. 3,519,697, issued July 7, 1970, column 5, which by reference is made part of the disclosures of the instant application. The percent char at 700°C. in nitrogen was determined by the method described by J. A. Parker and E. L. Winkler, in NASA Technical Report TR-276 (1967), which is incorporated in the present application by reference.

EXAMPLE 1

To a reaction vessel equipped with a nitrogen flow-through stirrer, water trap, reflux condenser, and thermometer were added 6.5 grams (0.0129 mol) of the tolane dianhydride of formula IV, 1.4282 grams (0.0132 mol) m-phenylene diamine, 12 ml. toluene, 26.7 ml. m-cresol and 0.0782 gram phthalic anhydride as chain-stopper (which controls the molecular weight of the polymer). The reaction mixture was heated at 170°C. under nitrogen with stirring for 6 hours, and the solid polymer obtained when the mixture was cooled was dissolved in 75 ml. of a 70:30 weight mixture of phenol:toluene by heating at the reflux temperature. The resulting hot solution was added to methanol, and the formed white precipitate was separated and dried in a vacuum oven at 100°C. to give the desired polyetherimide having the formula

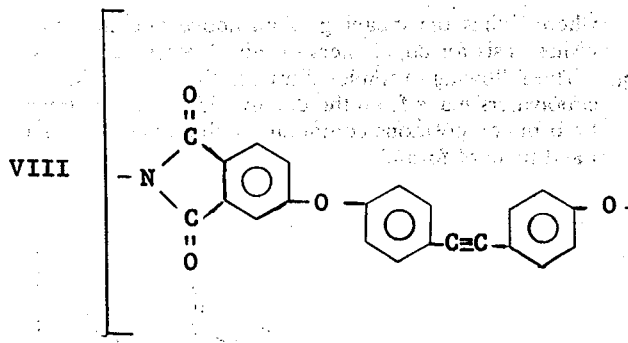

where $n$ is a whole number in excess of 1. This polymer had a Tg=247°C.; TGA$_{(N_2)}$=545°C.; TGA$_{(air)}$=500°C.; an oxygen index=45; and a percent char at 700°C.(N$_2$)=73 percent.

EXAMPLE 2

Using the same equipment and procedures as in Example 1, 8.02 grams (0.014 mol) of the dianhydride of formula V, was reacted with 1.5 grams (0.014 mol) m-phenylene diamine in 15 ml. toluene and 30 ml. m-cresol at 170°C. for 12 hours. The reaction mixture was cooled, dissolved in 50 ml. CHCl$_3$ and added to methanol to give a precipitate, which was separated and dried under vacuum to yield 8.04 grams of a polymer having an intrinsic viscosity in CHCl$_3$ of 0.294 dl/g.; an oxygen index of 56; a percent char at 700°C. (N$_2$) of 64%; Tg=219°C.; TGA$_{(N_2)}$=470°C.; TGA$_{(air)}$=470°C. The polymer was composed of recurring units of the formula

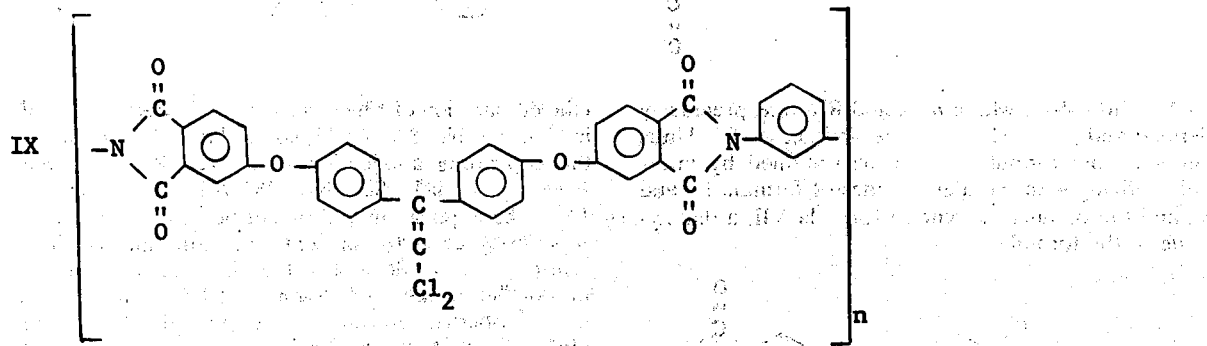

where $n$ is a whole number greater than 1.

It will also be apparent to those skilled in the art that in addition to having recurring units of formula I as the backbone of the polymer, these units can be present concurrently with other units of, for instance, those of the formula

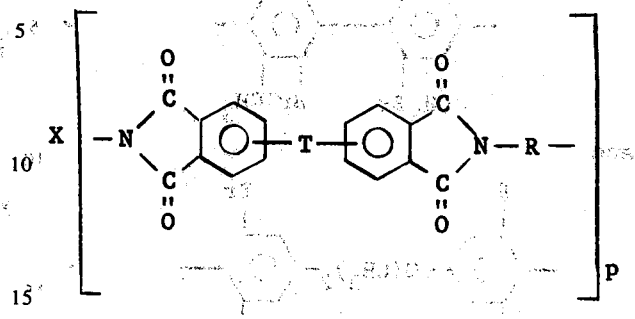

where T may be in the 3- or 4-position on the anhydride residue and is a radical selected from the class consisting of

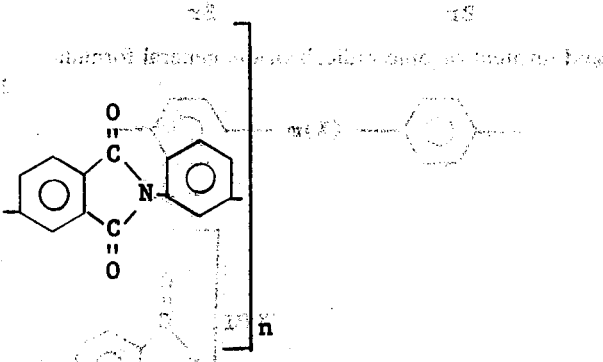

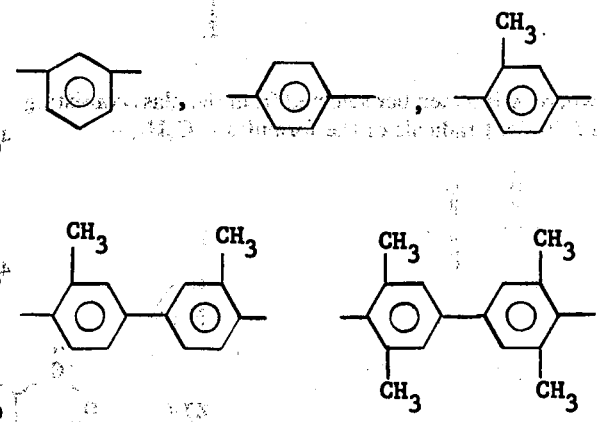

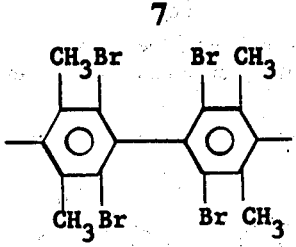

and

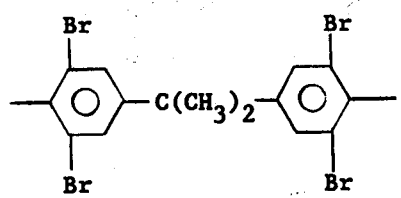

and divalent organic radicals of the general formula

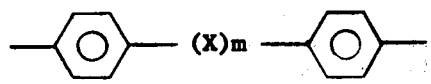

where X is a member selected from the class consisting of divalent radicals of the formulas $-C_xH_{2x}-$,

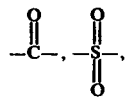

$-O-$ and $-S-$, where $m$, $x$ and R are as previously defined and $p$ is a whole number in excess of 1. Units derived from formula X may be obtained by interpolymerizing with the dianhydrides of formula IV and V, and the organic diamine of formula VII, a dianhydride of the formula XI 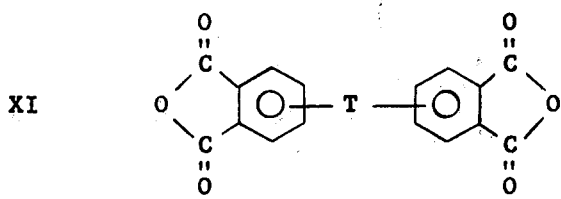

where T has the meaning given above. The presence of the recurring unit of formula X produces copolymers composed of polyimides and polyetherimides.

A still further modification may be obtained by employing dianhydrides of formula XII 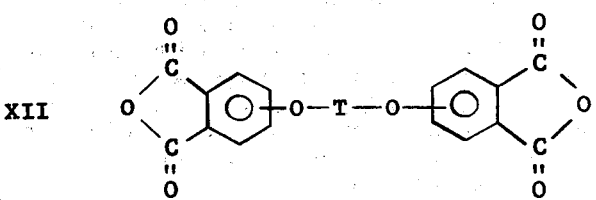

where T has the meaning given above and thus furnishes basis for copolymers of mixed polyetherimides.

The following examples illustrate the preparation of copolymers made from the dianhydrides recited above to form compositions containing both units of formula I and units of formula XIII 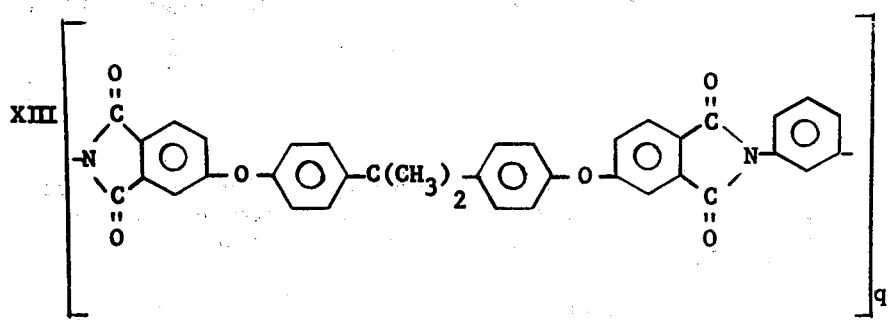

where $q$ is a whole number greater than 1.

EXAMPLE 3

Employing the apparatus and conditions recited in Example 1, 3.4119 grams (0.0068 mol) of the dianhydride of the formula IV and 3.5375 grams (0.0068 mol) of BPA dianhydride of the formula XIV 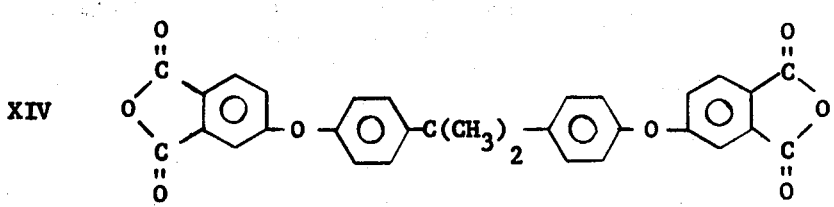

(the preparation of which is more particularly disclosed in U.S. Pat. No. 3,787,475, issued Jan. 22, 1974 and in the copending application of Darrell R. Heath and Joseph G. Wirth, Ser. No. 281,749, filed Aug. 18, 1972, the application and patent being assigned to the same assignee as the present invention, and which by reference are made part of the disclosures and teachings of the instant application) and 1.5 grams (0.0139 mol) m-phenylene diamine, together with 0.0822 gram phthalic anhydride was dissolved in a mixture of 15 ml. toluene and 28.7 ml. m-cresol. The reaction mixture was heated at 170°C. for 16 hours, and the viscous solution obtained, dissolved in 30 ml. chloroform, was added to methanol to effect precipitation of the desired polymer. This polymer was separated, dried in a vacuum at 100°C. to give a copolymeric composition composed of recurring structural units of formula VIII and units of formula XIII. This copolymer had an intrinsic viscosity in m-cresol $\eta$=0.63 dl/g.; a $T_g$=232°C.; TGA (in both air and $N_2$)=550°C.; an oxygen index of 36 and a percent char at 700°C. in nitrogen of 60%; smoke ($D_m$ corrected)=8 [see article by Loftus et al., ASTM Special Technical Publication 422 (1969) wherein $D_m$ is the maximum specific optical density corrected for deposit on an optical window]:

EXAMPLE 4

When Example 3 was repeated with the exception that 25 mol percent of the dianhydride of formula IV and 75% mol percent of the dianhydride of formula XIV was used, there was obtained a copolymer having the same recurring units as in Example 3 but in the molar ratio of the starting dianhydrides wherein the intrinsic viscosity (in $CHCl_3$) $\eta$=0.498 dl/g.; $T_g$=227°C.; TGA($N_2$)=550°C.; TGA(air)=475°C.; an oxygen index of 45, and a percent char at 700°C. when measured in nitrogen of 62 percent.

EXAMPLE 5

Employing the equipment and procedures described in Example 1, 2.0 grams (0.00347 mol) of the dianhydride of formula V, 5.418 grams (0.01042 mol) of the BPA dianhydride of formula XIV, 1.5 grams (0.01389 mol) m-phenylene diamine, in 15 ml. toluene and 30 ml. m-cresol were heated at the reflux temperature of the mass (170°C.) for 12 hours. The viscous solution obtained was cooled, dissolved in 50 ml. chloroform and this latter solution added to methanol to precipitate a polymer. The polymer was isolated and dried under vacuum to give 7.74 grams of a copolymeric composition composed of recurring structural units of formula IX and of formula XIII wherein the molar concentrations of the recurring units was essentially the same as the molar concentrations of the dianhydrides employed. The intrinsic viscosity of this polymer in $CHCl_3$ $\eta$=0.431 dl/g.; $T_g$=215°C.; oxygen index=46; TGA($N_2$)=510°C.; TGA(air)=470°C.; and a percent char at 700°C. in nitrogen of 62 percent.

EXAMPLE 6

Employing the equipment and procedures described in Example 1, 4.0137 grams (0.00694 mol) of the HDE dianhydride of formula V, 3.61 grams (0.00694 mol) of the BPA dianhydride of formula XIV, 1.5 grams (0.0139 mol) of m-phenylene diamine, together with 15 ml. toluene and 30.3 ml. m-cresol was formed into a solution which was then refluxed at 170°C. for 12 hours. The viscous composition obtained was dissolved in 30 ml. chloroform and the chloroform solution added slowly to an excess of methanol to give a precipitate, which was redissolved in $CHCl_3$ and reprecipitated into methanol. The precipitate was isolated and dried at 100°C. in a vacuum to give a polymer composed of recurring structural units of formula IX and recurring structural units of formula XIII, wherein the recurring units were in the molar ratios essentially equivalent to the molar ratios of the two dianhydrides used. The intrinsic viscosity of the polymer in chloroform $\eta$=0.402 dl/g.; $T_g$=219°C.; TGA($N_2$)=468°C.; TGA(air)=450°C.; oxygen index=44. The percent char at 700°C. measured in nitrogen was equal to 64 percent.

EXAMPLE 7

This example illustrates a method for making a copolymer by means of a Brabender mixer ("Plastic-Corder," Torque Rheometer, Model PLV-150, C. W. Brabender Instruments Inc., South Hackensack, N.J.); the mixer is equipped with a pair of roller type blades positioned within a head provided with heat transfer means. More particularly, to this Brabender mixer maintained at a temperature of 300°C. under a nitrogen blanket was added a well mixed powder consisting of 24 grams (0.04188 mol) of the HDE dianhydride of Formula V, 21.78 grams (0.04188 mol) of the BPA dianhydride of formula XIV, and 9.047 grams (0.08377 mol) m-phenylene diamine. The Brabender was allowed to run for 10 minutes until a polymeric composition was obtained. The intrinsic viscosity of this polymer in m-cresol $\eta$=0.40 dl/g.; $T_g$=221°C.; TGA($N_2$)=500°C.; TGA(air)=500°C.; oxygen index =49; the smoke ($D_m$ corrected) = 10. The polymer was composed of the same recurring units as in Example 6.

It will of course be apparent to those skilled in the art that in addition to the organic diamine employed in the foregoing examples, other organic diamines of formula VII can be employed, many examples of which have been given before without departing from the scope of the invention. The conditions of the reaction can be varied widely and the proportions of ingredients and types of ingredients used can also be varied widely depending on the desired molecular weight and intrinsic viscosity, ingredients used, application intended, etc.

Finally, it should be recognized that whereas a good part of the disclosures and teachings of the instant invention have been directed to polymers in which 4-substitution is described in the anhydride residue, it is also intended to have polyetherimides included wherein the substitution in the anhydride residue is in the 3-position. This can be exemplified by the use of anhydrides of the formula

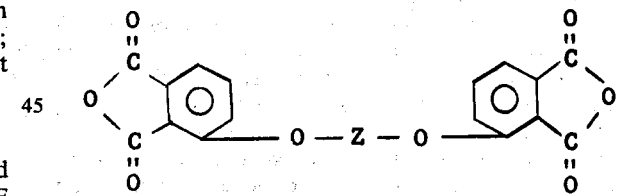

which in turn when coreacted with the organic diamine would give recurring structural units alone or copolymerized of the formula

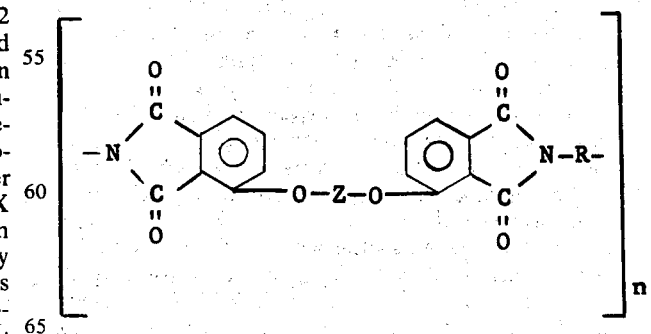

where Z, R, and n have the meanings given above.

The compositions of the present invention have application in a wide variety of physical shapes and form, including the use as films, molding compounds, coatings, etc. When used as films or when made into molded products, these polymers, including laminated products prepared therefrom, not only possess good physical properties at room temperature but they retain their strength and excellent response to workloading at elevated temperatures for long periods of time. Films formed from the polymeric compositions of this invention may be used in application where films have been used previously. Thus, the compositions of the present invention can be used in automobile and aviation applications for decorative and protective purposes, and as high temperature electrical insulation for motor slot liners, in transformers, as dielectric capacitors, as coil and cable wrappings (form wound coil insulation for motors), for containers and container linings, in laminating structures where films of the present composition or where solutions of the claimed compositions of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures. Films made from these compositions of matter can also serve in printed circuit applications.

Alternatively, solutions of the compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoro-ethylene, etc. The use of the curable compositions of the present invention as overcoats on other types of insulation is not precluded.

Applications which recommended these resins include their use as binders for asbestos fibers, carbon fibers, and other fibrous materials in making brakelinings. In addition, molding compositions and molded articles may be formed from the polymeric compositions in this invention by incorporating such fillers as asbestos, glass fibers, talc, quartz, powder, wood flour, finely divided carbon, silica, into such compositions prior to molding. Shaped articles are formed under heat, or under heat and pressure in accordance with practices well known in the art. In addition, various heat-resistant pigments and dyes may be incorporated as well as various types of inhibitors depending on the application intended.

The compositions herein defined may be suitably incorporated with other materials to modify the properties of the latter or in turn they may be modified by the incorporation of the materials, for example, they may be compounded with substances such as natural or synthetic rubbers, synthetic resins such as phenolaldehyde resins, alkyd resins, etc.; cellulosic materials such as paper, organic esters of cellulose such as cellulose acetate, cellulose ether; etc. Because of the favorable oxygen index and low smoke index, the incorporation of these polymers in other polymers which may not be so favorably disposed, for instance, polycarbonate resins, polyphenylene oxide resins, polybutylene terephalate resins, etc. in amounts ranging from 5 to 75 percent, by weight, based on the total weight of the polyetherimides and the aforesaid resins, can improve the properties of the resins in which the polyetherimides of the present invention are incorporated.

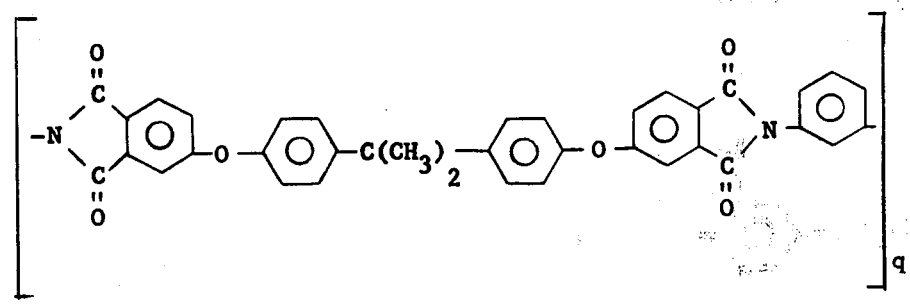

What we claim as new and desire to secure by Letters Patent of the United States is:

1. A polyetherimide corresponding to the formula

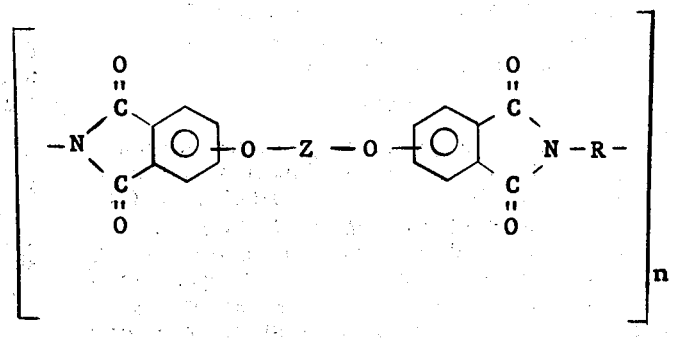

where $n$ is a whole number greater than 1, R is a divalent organic radical selected from the class consisting of a. aromatic hydrocarbon radicals having from 6–20 carbon atoms and halogenated derivatives thereof, b. alkylene radicals, $C_{(2-8)}$ alkylene terminated polydiorganosiloxanes, cyclo-alkylene radicals having from 2–20 carbon atoms, and (c) divalent radicals included by the formula

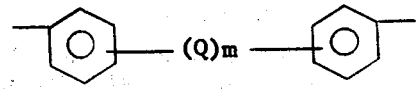

where Q is a member selected from the class consisting of

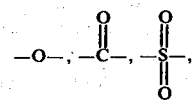

—S—, —$C_xH_{2x}$— where $x$ is a whole number from 1 to 5 inclusive, m is 0 or 1, and Z is a member selected from the groups

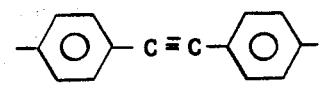

and

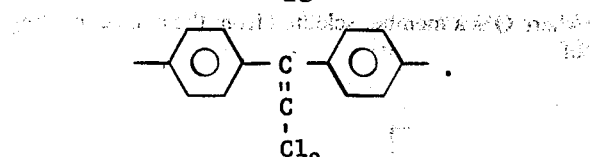

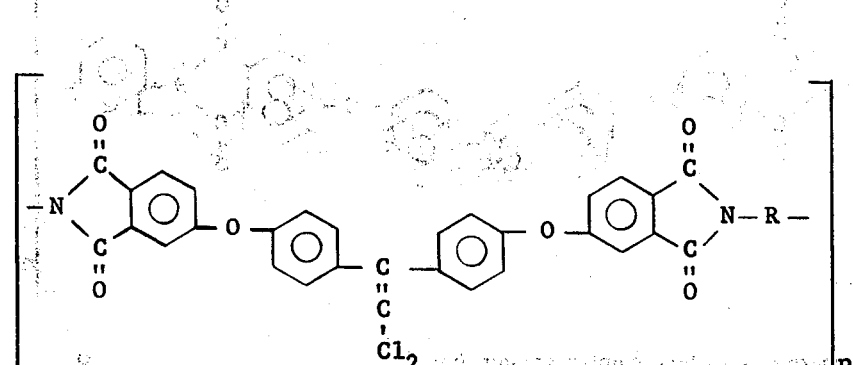

—S—, —$C_xH_{2x}$— where $x$ is a whole number from 1 to 5 inclusive, $m$ is 0 or 1, and n is a whole number greater than 1.

3. A polyetherimide composed of recurring units of the formula

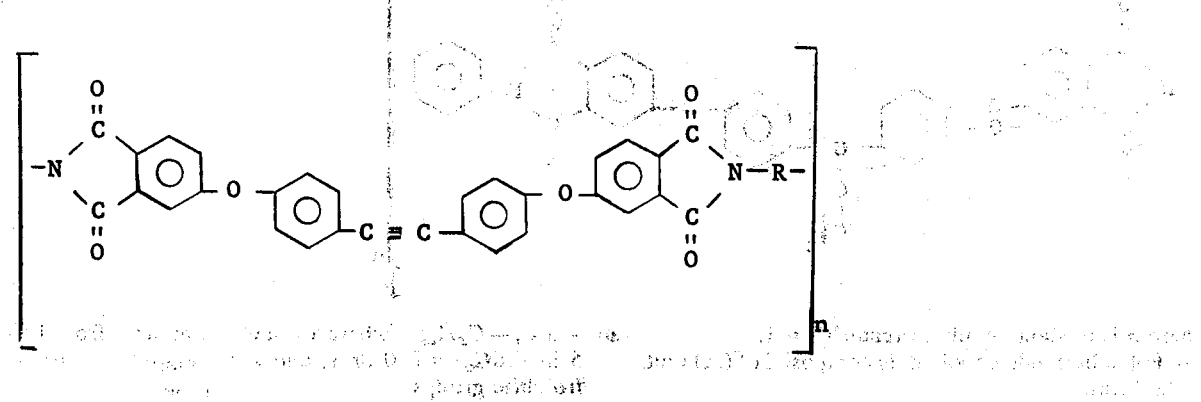

where R is a divalent organic radical selected from the class consisting of (a) aromatic hydrocarbon radicals having from 6-20 carbon atoms and halogenated derivatives thereof, (b) alkylene radicals, $C_{(2-8)}$ alkylene terminated polydiorganosiloxanes, cyclo-alkylene radicals having from 2-20 carbon atoms, and (c) divalent radicals included by the formula 2. A polyetherimide composed of recurring units of the formula where R is divalent organic radical selected from the class consisting of (a) aromatic hydrocarbon radicals having from 6-20 carbon atoms and halogenated derivatives thereof, (b) alkylene radicals, $C_{(2-8)}$ alkylene terminated polydiorganosiloxanes, cyclo-alkylene radicals having from 2-20 carbon atoms, and (c) divalent radicals included by the formula

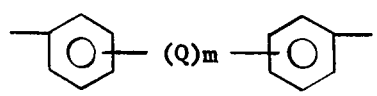

where Q is a member selected from the class consisting of

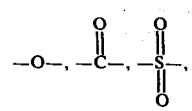

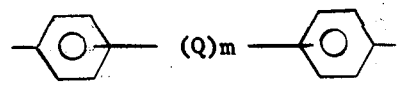

where Q is a member selected from the class consisting of

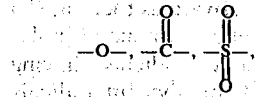

—S—, —$C_xH_{2x}$—, where $x$ is a whole number from 1 to 5 inclusive, and $m$ is 0 or 1, and n is a whole number greater than 1.

4. A polyetherimide composed of recurring units of the formula

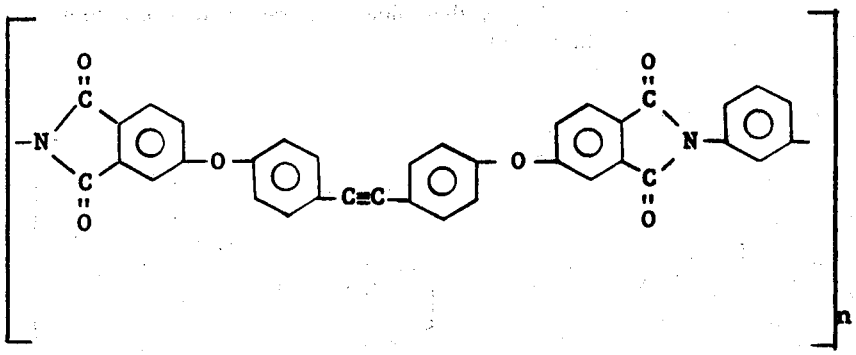

where n is a whole number greater than 1.

5. A polyetherimide composed of recurring structural units of the formula

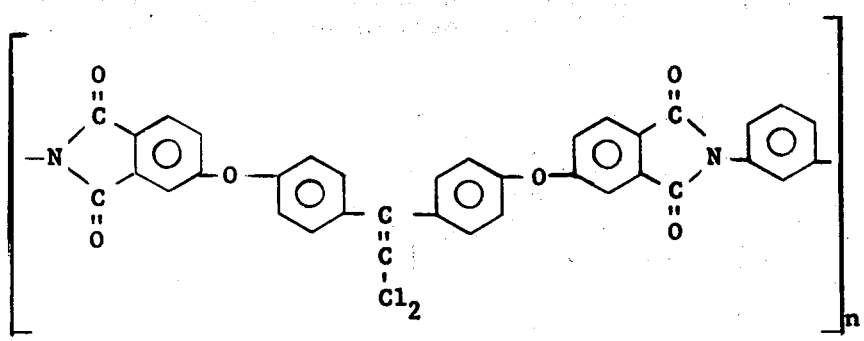

where n is a whole number greater than 1.

6. Polyetherimide copolymers composed of (A) units of the formula

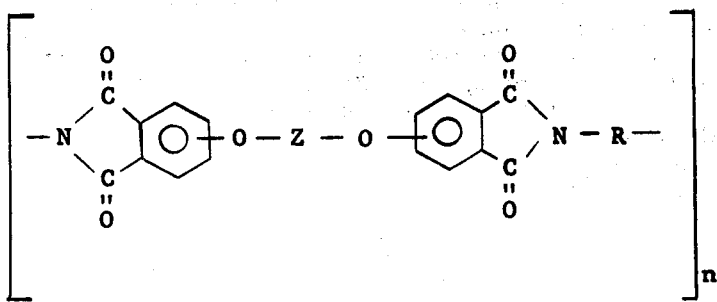

where n is a whole number greater than 1, R is a divalent organic radical selected from the class consisting of (a) aromatic hydrocarbon radicals having from 6–20 carbon atoms and halogenated derivatives thereof, (b) alkylene radicals, $C_{(2-8)}$ alkylene terminated polydiorganosiloxanes, cyclo-alkylene radicals having from 2–20 carbon atoms, and (c) divalent radicals included by the formula

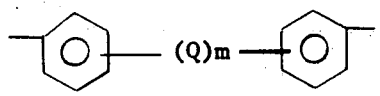

where Q is a member selected from the class consisting of

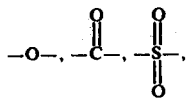

—S—, —$C_xH_{2x}$— where x is a whole number from 1 to 5 inclusive, m is 0 or 1, and Z is a member selected from the groups

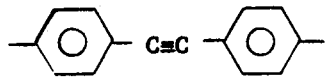

and

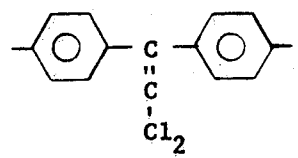

and (B) units of the formula
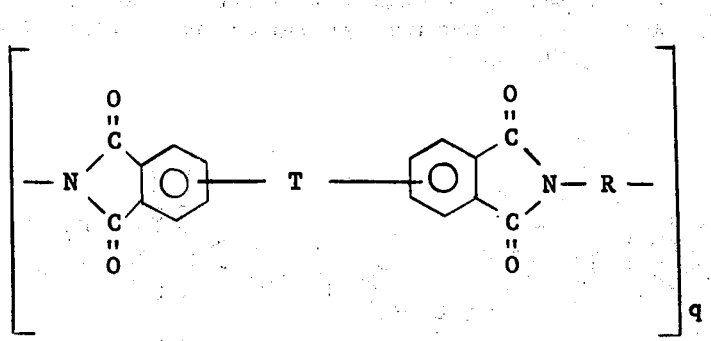
where T may be in the 3- or 4-position on the anhydride residue and is a radical selected from the class consisting of
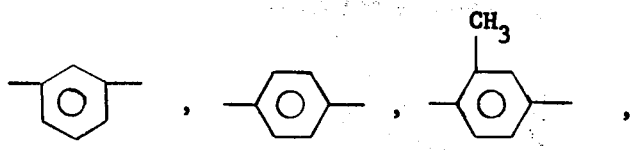
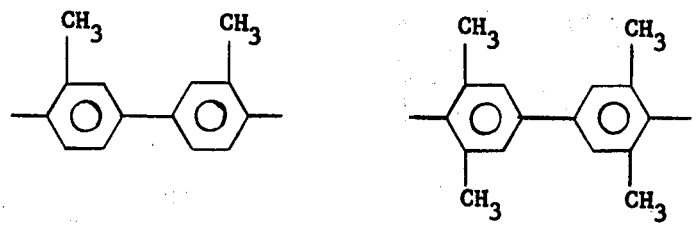
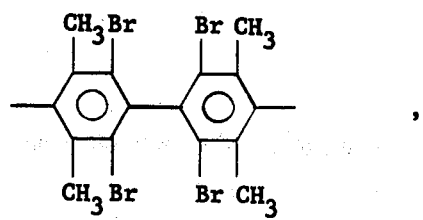
and
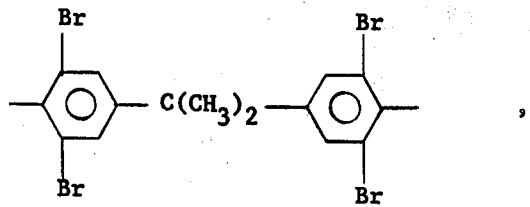
and divalent organic radicals of the general formula
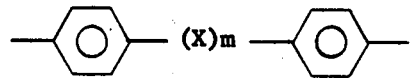

where X has the same meaning as Q, where $m$, $x$ and R are as previously defined, and $q$ is a whole number in excess of 1.

where $q$ and $n$ are whole numbers greater than 1.

8. Polyetherimide copolymers composed of units of the formula

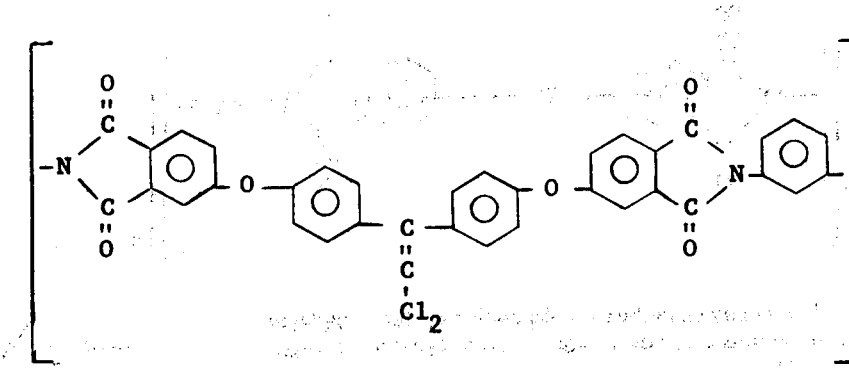

7. Polyetherimide copolymers composed of units of the formula

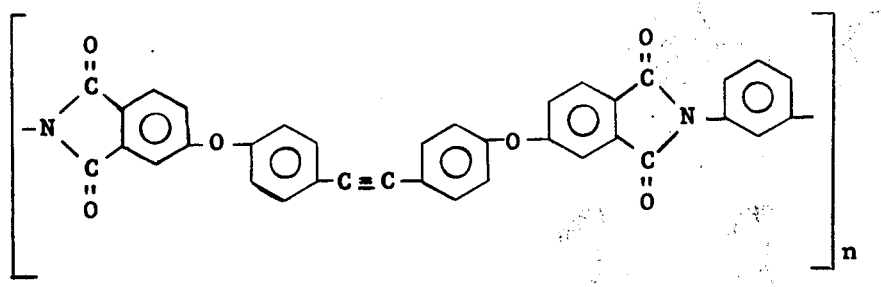

and units of the formula

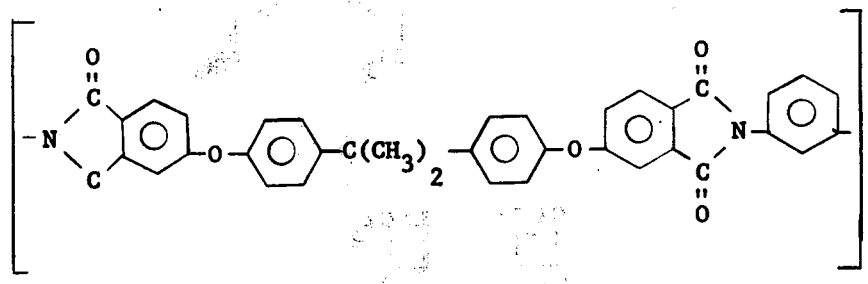

where $q$ and $n$ are whole numbers greater than 1.

and units of the formula